(12) United States Patent
Bent et al.

(10) Patent No.: US 10,901,943 B1
(45) Date of Patent: Jan. 26, 2021

(54) MULTI-TIER STORAGE SYSTEM WITH DIRECT CLIENT ACCESS TO ARCHIVE STORAGE TIER

(71) Applicant: EMC IP Holding Company LLC, Hopkinton, MA (US)

(72) Inventors: John M. Bent, Los Alamos, NM (US); Sorin Faibish, Newton, MA (US); James M. Pedone, Jr., West Boylston, MA (US); Percy Tzelnic, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 464 days.

(21) Appl. No.: 15/282,076

(22) Filed: Sep. 30, 2016

(51) Int. Cl.
*G06F 16/11* (2019.01)
*G06F 16/182* (2019.01)
*G06F 16/18* (2019.01)

(52) U.S. Cl.
CPC .......... *G06F 16/122* (2019.01); *G06F 16/182* (2019.01)

(58) Field of Classification Search
None
See application file for complete search history.

(56) References Cited

U.S. PATENT DOCUMENTS

| 2003/0061352 | A1* | 3/2003 | Bohrer | G06F 16/9574 709/226 |
|---|---|---|---|---|
| 2007/0055703 | A1* | 3/2007 | Zimran | H04L 29/12594 |
| 2008/0228770 | A1* | 9/2008 | Halcrow | G06F 16/119 |
| 2009/0319532 | A1* | 12/2009 | Akelbein | G06F 16/185 |
| 2010/0241726 | A1* | 9/2010 | Wu | G06F 12/0862 709/217 |
| 2010/0332401 | A1* | 12/2010 | Prahlad | G06F 3/0649 705/80 |
| 2012/0310892 | A1* | 12/2012 | Dam | G06F 16/1748 707/659 |
| 2013/0041872 | A1* | 2/2013 | Aizman | G06F 16/182 707/690 |
| 2013/0110778 | A1* | 5/2013 | Taylor | G06F 11/1435 707/624 |

(Continued)

OTHER PUBLICATIONS

Read, "Lustre HSM in the Cloud," 2015) (Year: 2015).*

(Continued)

*Primary Examiner* — Usmaan Saeed
*Assistant Examiner* — Yu Zhao
(74) *Attorney, Agent, or Firm* — Ryan, Mason & Lewis, LLP

(57) ABSTRACT

A multi-tier storage system is provided with direct client access to an archive storage tier for input/output operations. An exemplary method comprises communicating over a network with (i) a cluster file system on a first storage tier, and (ii) a second archive storage tier comprising an object store; providing a client of the cluster file system with access to one or more files in the cluster file system on the first storage tier; and executing a translation shim to provide the client of the cluster file system with one or more of read and write access to one or more files on the second archive storage tier. The translation shim converts between the protocols of the cluster file system and the protocols of the second archive storage tier, to allow unmodified applications to optionally access the second archive storage tier using existing cluster file system protocols.

20 Claims, 9 Drawing Sheets

(56) References Cited

U.S. PATENT DOCUMENTS

2016/0266801 A1* 9/2016 Marcelin Jemenez ..................... G06F 3/0604
2017/0249331 A1* 8/2017 Yammine ............ G06F 11/1448

OTHER PUBLICATIONS

King, "The Infrastructure of Petabyte-Scale Scientific Data Archiving," Jun. 2016 (Year: 2016).*

"VIPR EMC Atmos Object Service API Support", https://www.emc.com/techpubs/vipr/ds_atmos_supported_features-1.htm, downloaded on Sep. 27, 2016.

Petersen, Torben Kling, "Inside Lustre HSM—An Introduction to the newly HSM-enabled Lustre 2.5.x parallel file system" Seagate 2015.

"Amazon S3 Rest API Introduction", http://docs.aws.amazon.com/AmazonS3/latest/API/Welcome.html, downloaded on Jul. 27, 2016.

Degremont, et al., "Lustre HSM Project, Lustre User Advanced Seminars", LUG 2010.

* cited by examiner

FIG. 4

TRANSLATION READ PROCESS 400

LUSTRE CLIENT 124 OPENS FILE *fname* (XATTR) FOR READ OPERATION FROM CAPACITY TIER 130   410

TRANSLATION SHIM 210 INTERCEPTS CALLS TO CAPACITY TIER 130 BASED ON XATTR AND CONSULTS METADATA WAREHOUSE 250   420

TRANSLATION SHIM 210 CONNECTS TO CAPACITY TIER 130 AND READS CONTENTS OF *fname* BUCKET, IF IT EXISTS   430

TRANSLATION SHIM 210 BRINGS METADATA/"LAYOUT" FROM *fname* BUCKET TO LUSTRE CLIENT 124   440

TRANSLATION SHIM 210 SENDS OID OF THE SHARDS OF LUSTRE AS LUSTRE OSD TO LUSTRE CLIENT 124   450

LUSTRE CLIENT 124 READS SHARDS FROM CAPACITY TIER 130 DIRECTLY USING IP ADDRESS OF CAPACITY TIER 130 THROUGH TRANSLATION SHIM 210 ACCORDING TO LAYOUT   460

TRANSLATION SHIM 210 TRANSFORMS OBJECT GET FROM CAPACITY TIER 130 TO FILE BLOCK READ I/Os   470

MULTI-TIER STORAGE SYSTEM WITH DIRECT CLIENT ACCESS TO ARCHIVE STORAGE TIER

FIELD

The field relates generally to data storage and, more particularly, to parallel file systems and other types of cluster file systems.

BACKGROUND

A cluster file system, such as a Lustre file system, allows multiple client devices to share access to files over a network. Lustre file systems often employ a secondary archival storage tier for cheaper long term data storage. Once a file has been stored on the archival storage tier, however, the file must be re-promoted to the Lustre file system from the archival storage tier when the file is opened for reading, causing additional latency.

BRIEF DESCRIPTION OF THE DRAWINGS

FIG. 4 is a flow chart illustrating an exemplary implementation of a translation read process according to one embodiment of the invention;

DETAILED DESCRIPTION

Figure 1:
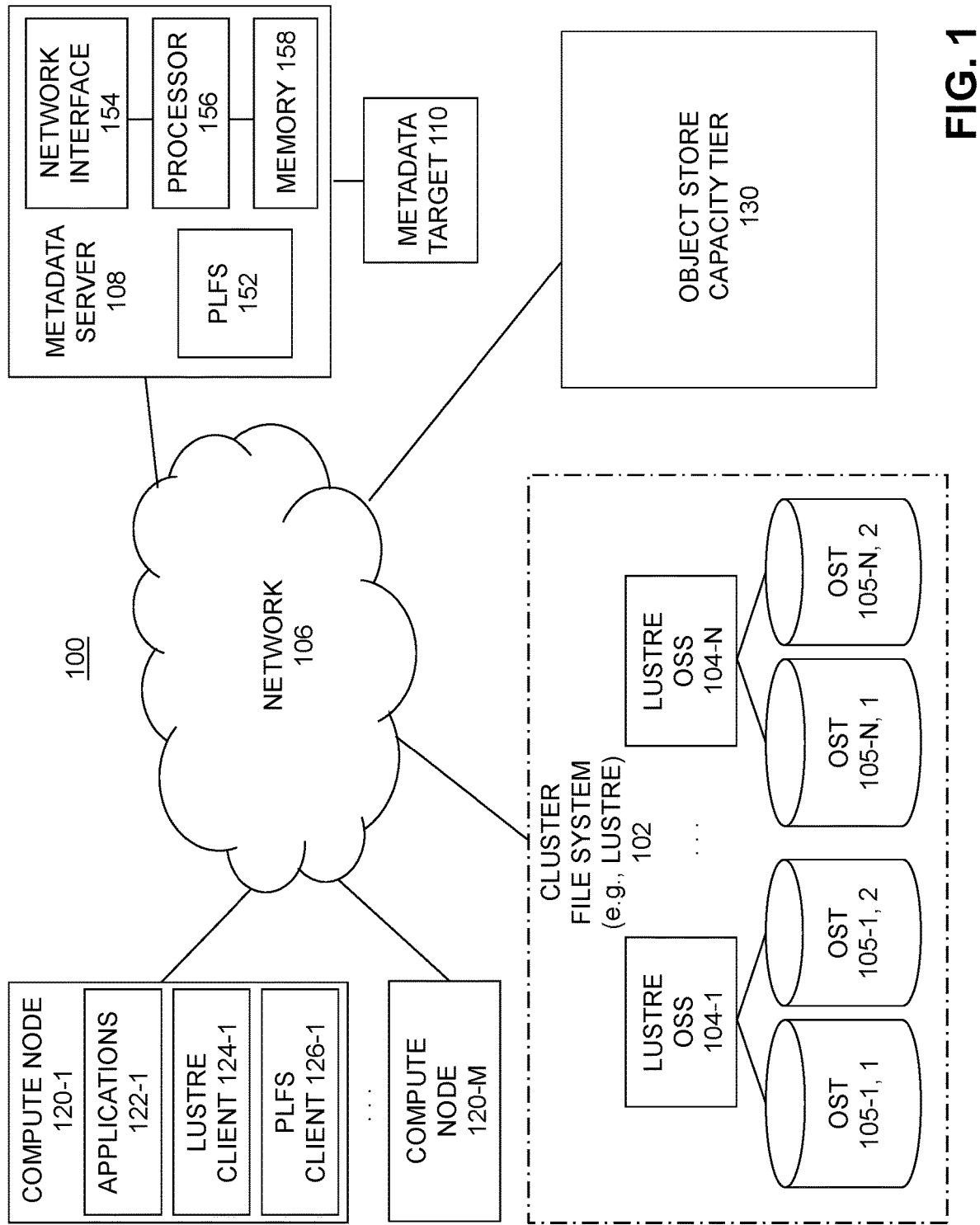
FIG. 1 is a block diagram of a cluster file system in an illustrative embodiment of the invention.

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices. One or more embodiments of the invention provide methods and apparatus for configuring a multi-tier storage system to provide clients with direct access to an archive storage tier for input/output operations.

In one or more embodiments, a storage system is provided for distributed file systems that provides storage tiering, as needed, while preserving the same storage interface to both the performance tier as well as the capacity tier. While one or more embodiments of the invention are illustrated in the context of a Lustre parallel file system and a secondary archival store in typical High Performance Computing (HPC) environments, the invention may be implemented for all workloads requiring high performance to hot data while storing large quantities of large data in a colder storage tier, such as a cloud or object store.

Lustre file systems include a Hierarchical Storage Management (HSM) function that performs auto-tiering using a policy management system that migrates cold data to an archive tier and restores (i.e., fetches) missing data back into the primary Lustre file system when a file stored on the archive tier is opened for reading. HSM employs a concept that is similar to i-nodes in a standard virtual file system (VFS). The i-node in Lustre for a migrated file indicates that the file has been migrated. Therefore, when that file is opened to be read, Lustre sees that the status of the file is migrated and it blocks the reader until the file can be re-promoted back into Lustre from the archive tier. The performance of waiting for a file to be fully re-promoted from the archive tier, however, can add an unacceptable latency (especially for small reads to large files). In addition, the restored file can potentially evict other hot data.

In one or more embodiments, a shim translation layer is provided that converts between the object protocol of the Lustre file system and the protocol of the archive storage tier, thereby allowing substantially unmodified applications to access the archive tier through the existing Lustre protocols to a virtual Lustre filesystem on the archive tier with its objects backed by a cheaper large object tier such as Amazon S3. In this manner, clients have direct access to data on all levels of the storage tier without requiring costly tier migrations and each tier can be managed as a Lustre file system.

FIG. 1 shows a parallel file system 100 configured in accordance with an illustrative embodiment of the present invention. The parallel file system 100 comprises a plurality of compute nodes 120-1 through 120-M that are configured to store files on a cluster file system 102, such as a Lustre file system and/or an object store capacity tier 130.

As shown in FIG. 1, the exemplary Lustre file system 102 comprises a plurality of object storage servers 104-1 through 104-N. Each of the object storage servers 104 has one or more corresponding storage devices 105 which may comprise a storage array or other type of storage device. Thus, the exemplary object storage servers 104-1 through 104-N have associated exemplary storage devices 105-1,1 and 105-1, 2 through 105-N, 1 and 105-N, 2, respectively. The compute nodes 120 and the object storage servers 104 communicate with one another over a network 106. The storage devices 105 are also referred to herein as object storage targets of their corresponding object storage servers 104.

The parallel file system 100 further comprises a metadata server 108 having an associated metadata target 110. The metadata server 108 is configured to communicate with compute nodes 120 and object storage servers 104 over the network 106. For example, the metadata server 108 may receive metadata requests from clients on compute nodes 120 over the network 106 and transmit responses to those requests back to the clients over the network 106. The metadata server 108 utilizes its metadata target 110 in processing metadata requests received from the clients over the network 106. The metadata target 110 may comprise a storage array or other type of storage device.

The metadata server 108 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the metadata server 108 is network interface circuitry 154. The network interface circuitry 154 allows the metadata server 108 to communicate over the network 106 with, for example, clients and object storage servers 104. The network interface circuitry 154 may comprise, for example, one or more conventional transceivers.

The metadata server 108 further comprises a parallel log-structured file system (PLFS) 152, as discussed further below in conjunction with FIG. 3. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

The object store capacity tier 130 may be implemented, for example, as one or more of an EMC® Isilon® cluster having object storage; Cloud storage, such as EMC® ATMOS cloud storage or Amazon™ Simple Storage Service (Amazon S3) cloud storage; or tape storage.

Generally, the object store capacity tier 130 is typically larger and cheaper (and therefore typically exhibits less performance) than the exemplary Lustre file system 102. The exemplary Lustre file system 102 in the present embodiment is assumed to comprise a flash memory or other high-speed memory having a substantially lower access time than the object store capacity tier 130.

As shown in FIG. 1, the exemplary compute node 120-1 comprises one or more applications 122-1, a Lustre client 124-1 of the Lustre file system 102 and a PLFS client 126-1 of PLFS 152. The functionality of these entities will be discussed further below in conjunction with FIGS. 2-7.

Storage arrays utilized in the Lustre file system 102 may comprise, for example, storage products such as VNX and Symmetrix VMAX, both commercially available from EMC Corporation of Hopkinton, Mass. A variety of other storage products may be utilized to implement at least a portion of the object storage targets and metadata target of the Lustre file system 102.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 may optionally be arranged into a plurality of storage tiers, in a known manner. As noted above, each of the storage devices 105 may be viewed as being representative of an object storage target of the corresponding one of the object storage servers 104.

The clients may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

Also, although two object storage targets 105 are associated with each object storage server 104 in the FIG. 1 embodiment, other embodiments may associate a different number of object storage targets with each object storage server.

The metadata server 108 comprising processor 156, memory 158 and network interface 154 components as described above is an example of what is more generally referred to herein as a "processing device." Each of the compute nodes 120 and object storage servers 104 may similarly be implemented as a processing device comprising processor, memory and network interface components.

Although only a single metadata server 108 is shown in the FIG. 1 embodiment, a given cluster file system in other embodiments may comprise multiple metadata servers 108.

The cluster file system 102 may be implemented, by way of example, in the form of a Lustre file system, although use of Lustre is not a requirement of the present invention. Accordingly, servers 104 and 108 need not be configured with Lustre functionality, but may instead represent elements of another type of cluster file system.

Figure 2:
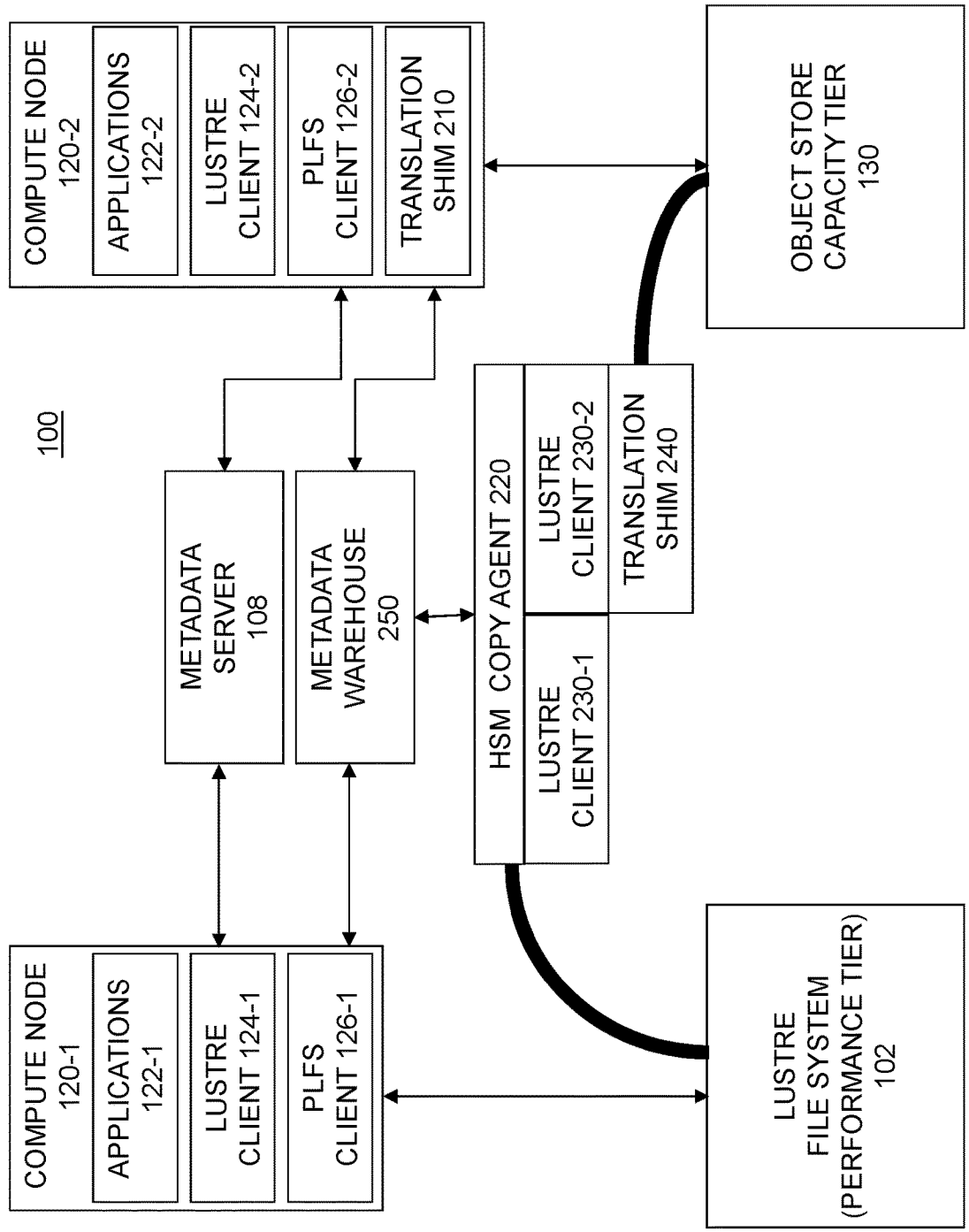
FIG. 2 shows the parallel file system of FIG. 1 in further detail, according to an embodiment of the invention.

FIG. 2 shows the parallel file system 100 of FIG. 1 in further detail, according to an illustrative embodiment of the present invention. In the embodiment of FIG. 2, the components of the parallel file system 100 having the same label numbers as FIG. 1 operate as described above in conjunction with FIG. 1. As shown in FIG. 2, one or more compute nodes 120, such as compute node 120-2, include a translation shim 210 that converts between the object protocol of the Lustre file system 102 and the protocol of the object store capacity tier 130, thereby allowing substantially unmodified applications 122 to access the archive object store capacity tier 130 through existing Lustre protocols to a virtual Lustre file system on the archive object store capacity tier 130 with its objects backed by the cheaper object store. In this manner, clients have direct access to data on all levels of the multi-tier storage system without requiring costly tier migrations and each tier can be managed as a Lustre file system.

The translation shim 210 provides a translation layer that converts from the Lustre object protocol to the object protocol of the object store capacity tier 130 thereby granting the convenience of a secondary Lustre tier with the economic characteristics of a much cheaper object store. Among other benefits, clients can directly access data on the first tier comprising the Lustre file system 102 or the second tier comprising the object store capacity tier 130.

In one or more embodiments, the existing HSM tiering mechanisms provided by a Lustre file system 102, along with any associated policy engines, are used to archive files from the Lustre file system 102 to the object store capacity tier 130 and to restore files from the object store capacity tier 130 to the Lustre file system 102, as needed. Generally, HSM automatically migrates cold data to an archive tier and restores missing data back into Lustre when a file is opened for reading, thereby moving data between high-cost and low-cost storage media. Generally, the i-node in the Lustre file system 102 for a migrated file indicates that the file has been migrated. Therefore, when the migrated file is opened to be read, the Lustre file system 102 recognizes that the file has been migrated and the Lustre file system 102 blocks the reader until the file can be re-promoted back into the Lustre file system 102 from the archive tier.

The HSM tiering mechanisms provided by an HSM copy agent 220 of a conventional Lustre file system are modified herein to include a translation shim 240 that stores data into a secondary Lustre system instead of an HSM system, as discussed further below. The HSM copy agent 220 employs Lustre clients 230-1 and 230-2, in a known manner.

In one or more embodiments, the translation shim 210 can answer data mapping queries to return the object identifiers of the underlying cloud objects backing the secondary Lustre namespace. Therefore, in addition to allowing direct access through the primary Lustre access protocols, clients can also access the same data through cloud protocols and big data analytics paradigms such as HDFS and map-reduce. Realizing that current HSM solutions can export an existing HSM namespace to a new Lustre primary tier, one or more embodiments leverage these mechanisms to allow incremental exports of modified HSM namespaces such that modifications to cold data in the object store capacity tier 130 are made visible to applications accessing through the primary tier.

Among other benefits, clients on the same compute node 120-2 can directly access files in the Lustre file system 102 and/or the object store capacity tier 130 using the same API.

As shown in FIG. 2 and discussed further below, a metadata warehouse 250 stores information regarding storage locations and methods of access for files in both the Lustre file system 102 and the object store capacity tier 130. For example, for a file stored in the object store capacity tier 130, the metadata warehouse 250 stores a location of the bucket that stores objects related to the file. Likewise, for a file stored in the Lustre file system 102, the metadata warehouse 250 stores an IP Address for the metadata server 108 that serves the metadata associated with the file. The manner in which the metadata is processed for various file I/O operations is discussed further below in conjunction with FIGS. 3-7.

Figure 3:
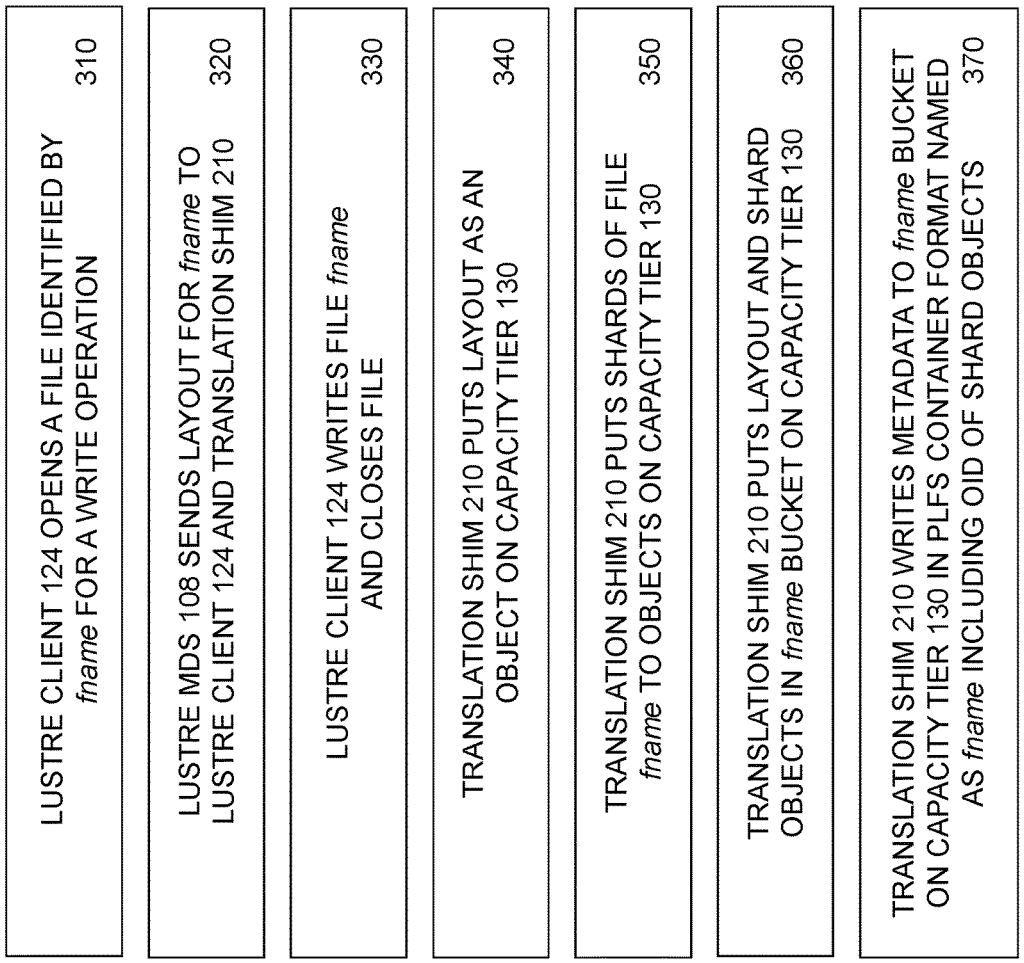
FIG. 3 is a flow chart illustrating an exemplary implementation of a translation write process according to one embodiment of the invention.

FIG. 3 is a flow chart illustrating an exemplary implementation of a translation write process 300 according to one embodiment of the invention. The exemplary translation write process 300 performs a write operation of files as objects to the object store capacity tier 130. As shown in FIG. 3, the Lustre client 124 initially opens a file identified by fname for a write operation during step 310. The Lustre metadata server 108 sends the layout for the file fname to the Lustre client 124 and the translation shim 210 during step 320. The Lustre client 124 uses the layout to write the file fname and closes the file during step 330.

In addition, as shown in FIG. 3, the translation shim 210 puts the layout as an object on the object store capacity tier 130 during step 340; puts the shards of the file fname to objects on the object store capacity tier 130 during step 350; puts the layout and shard objects in the fname bucket on the object store capacity tier 130 during step 360; and writes the metadata for the file to the fname bucket on the object store capacity tier 130 in a PLFS Container format named as fname including the OID of the shard objects during step 370.

FIG. 4 is a flow chart illustrating an exemplary implementation of a translation read process 400 according to one embodiment of the invention. The exemplary translation read process 400 performs a read operation of objects from the object store capacity tier 130. As shown in FIG. 4, the Lustre client 124 initially opens the file fname with an eXtended attribute (xattr) for a read operation from the object store capacity tier 130 during step 410.

The translation shim 210 intercepts calls to the object store capacity tier 130 during step 420 based on the eXtended attribute and consults the metadata warehouse 250. The translation shim 210 also connects to the object store capacity tier 130 during step 430 and reads the contents of the fname bucket, if it exists. The translation shim 210 brings the metadata/"layout" from the fname bucket to the Lustre client 124 during step 440, and sends the OID of the shards of Lustre as a Lustre OSD to the Lustre Client 124 during step 450.

The Lustre client 124 then reads the shards from the object store capacity tier 130 directly, using the IP address of the object store capacity tier 130, through the translation shim 210 according to the layout during step 460. The translation shim 210 transforms the object get from the object store capacity tier 130 to file block read I/O operations during step 470.

Figure 5:
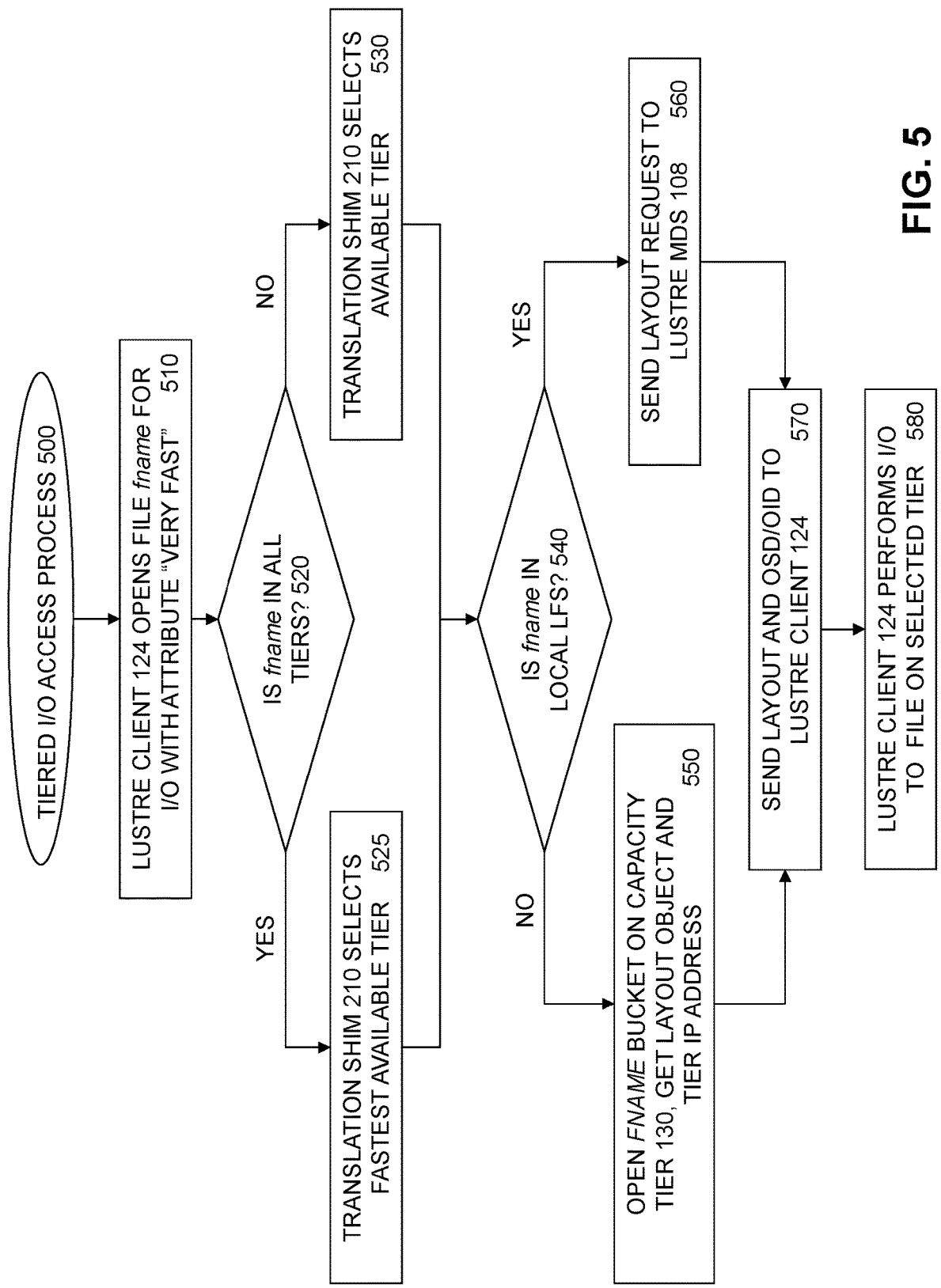
FIG. 5 is a flow chart illustrating an exemplary implementation of a Tiered I/O Access Process according to one embodiment of the invention.

FIG. 5 is a flow chart illustrating an exemplary implementation of a tiered I/O access process 500 according to one embodiment of the invention. The exemplary tiered I/O access process 500 is an optional optimization technique for a file open operation. As shown in FIG. 5, a Lustre client 124 initially opens a file fname for an I/O operation with an attribute of "very fast" during step 510.

A test is performed during step 520 to determine if the file fname is in all of the available storage tiers 102, 130. If it is determined during step 520 that the file fname is in all of the available storage tiers, then the translation shim 210 selects the fastest available tier during step 525. If, however, it is determined during step 520 that the file fname is not in all of the storage tiers, then the translation shim 210 selects an available tier during step 530.

A further test is performed during step 540 to determine if the file fname is in the local Lustre file system 102. If it is determined during step 540 that the file fname is not in the local Lustre file system 102, then the fname bucket is opened on the object store capacity tier 130, and the layout object and tier IP address are obtained during step 550. If it is determined during step 540 that the file fname is in the local Lustre file system 102, then the layout request is sent to the Lustre metadata server 108 during step 560.

The layout and OSD/OID information for the file is sent to the Lustre client 124 during step 570. The Lustre client 124 then performs the I/O operation to the file on the selected tier during step 580.

Figure 6:
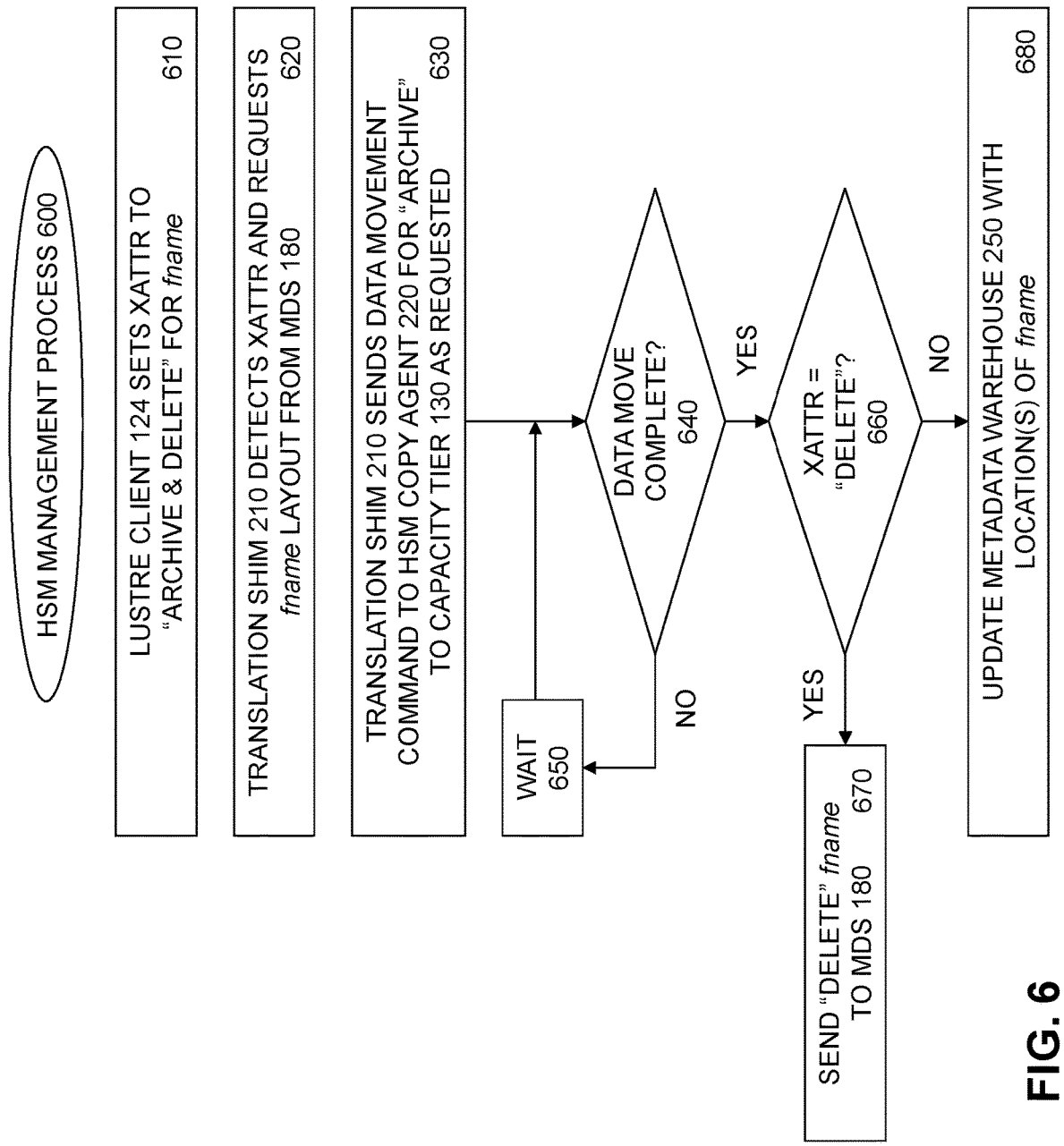
FIG. 6 is a flow chart illustrating an exemplary implementation of an HSM Management Process according to one embodiment of the invention.

FIG. 6 is a flow chart illustrating an exemplary implementation of an HSM management process 600 according to one embodiment of the invention. The exemplary HSM management process 600 performs an archival function. As shown in FIG. 6, the Lustre client 124 sets the eXtended attribute to "archive & delete" for the file fname during step 610.

The translation shim 210 detects the eXtended attribute during step 620 and requests the fname layout from the metadata servers 180. Thereafter, the translation shim 210 sends one or more data movement commands to the HSM copy agent 220 for an "archive" to the object store capacity tier 130, as requested during step 630, using the translation shim 240.

A test is performed during step 640 to determine if the data move is complete. The HSM management process 600 waits during step 650 until the data move is complete. Once it is determined during step 640 that the data move is complete, then a further test is performed during step 660 to determine if the eXtended attribute (xattr) is set to "delete". If the eXtended attribute (xattr) is set to "delete," then a "delete" fname request is sent to the metadata servers 180 during step 670. If, however, the eXtended attribute (xattr) is not set to "delete," then the metadata warehouse 250 is updated during step 680 with location(s) of the file fname.

Figure 7:
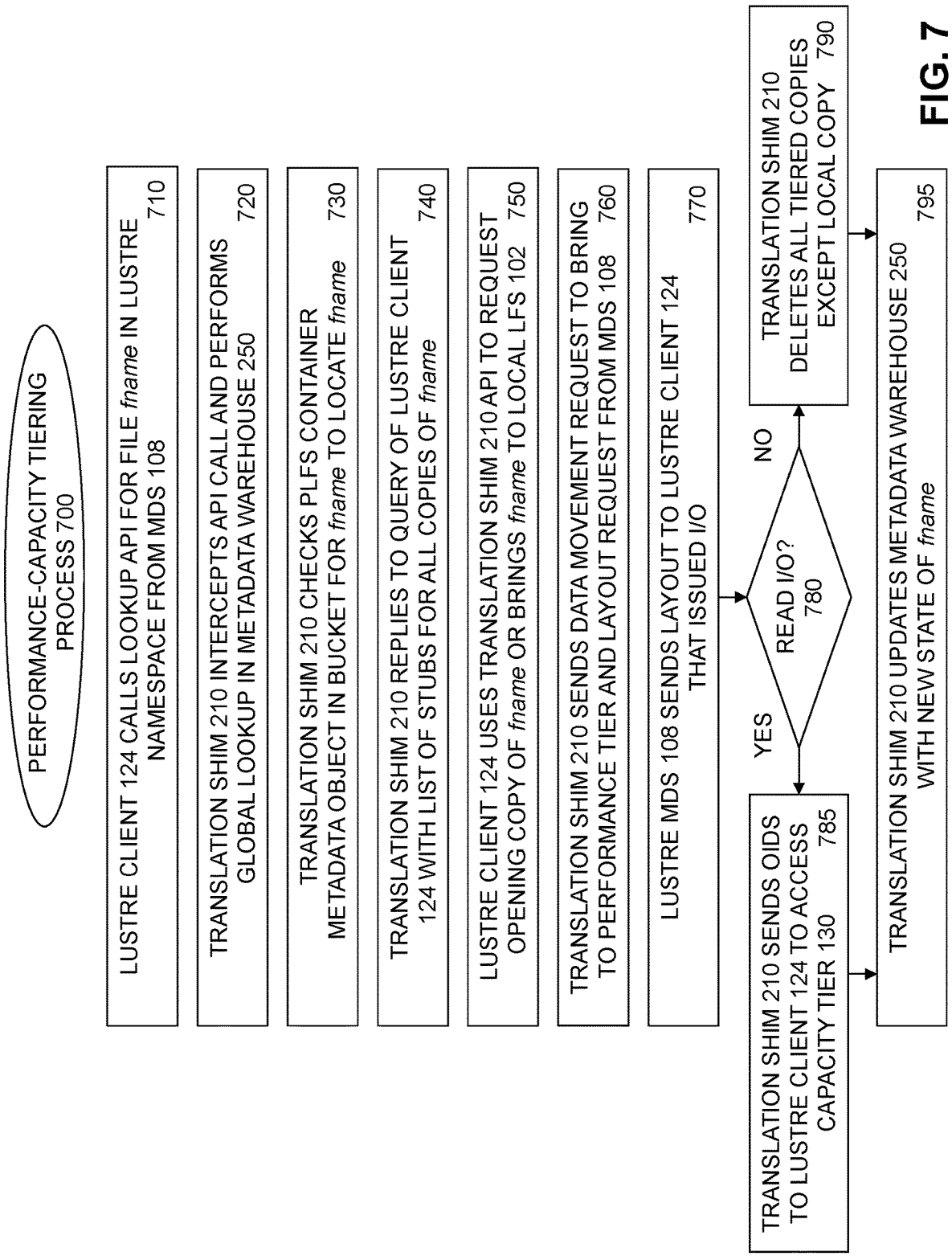
FIG. 7 is a flow chart illustrating an exemplary implementation of a Performance-Capacity Tiering Process according to one embodiment of the invention.

FIG. 7 is a flow chart illustrating an exemplary implementation of a performance-capacity tiering process 700 according to one embodiment of the invention. Generally, the exemplary performance-capacity tiering process 700 transfers files between the Lustre file system 102 and the object store capacity tier 130. The translation shim 210 reads objects from the object store capacity tier 130 into a single file or accesses the metadata server 108 to get the layout for the file on the Lustre file system 102.

As shown in FIG. 7, a Lustre client 124 initially calls a lookup API for the file fname in the Lustre namespace from the metadata server 108 during step 710. The translation shim 210 intercepts the API during step 720 call and performs a global lookup in the metadata warehouse 250 to get the bucket identifier for fname. The translation shim 210 then checks the PLFS container metadata object in the bucket for fname to locate the file fname during step 730.

The translation shim 210 replies to the query of the Lustre Client 124 during step 740 with a list of stubs (i-nodes) for all copies of the file fname during step 740. The Lustre client 124 uses the API of the translation shim 210 to request opening a copy of the file fname or brings the file fname to the local Lustre file system 102 during step 750. The translation shim 210 sends a data movement request to bring the file to the performance tier 102 and sends a layout request to obtain the metadata from the metadata server 108 during step 760.

The Lustre metadata server 108 sends the layout to the Lustre client 124 that issued the I/O request during step 770. A test is performed during step 780 to determine if the I/O operation is a read operation. If it is determined during step 780 that the I/O operation is a read operation, then the translation shim 210 sends the OIDs for the file to the Lustre client 124 during step 785 to access the object store capacity tier 130. If, however, it is determined during step 780 that the I/O operation is not a read operation, then the translation shim 210 deletes all tiered copies of the file except the local copy of the file during step 790.

Finally, the translation shim 210 updates the metadata warehouse 250 during step 795 with the new state of the file fname.

EXAMPLES

In one exemplary implementation, a sensor network creates large ingest data streams which require immediate processing of the recent data. This data goes to the Lustre file system 102 where near-real time analysis extracts additional information. The original data and the extracted insights are tiered into the secondary Lustre system in the object store capacity tier 130 through the HSM copy agent 220. At a later point in time, new sensor readings require background correlation with cold data. Because the primary Lustre tier 102 is fully saturated with the foreground activity, promoting the cold data back into Lustre would perturb the foreground activity resulting increased latency of I/O and potentially lost data. Therefore, the background correlation analysis can be done directly using the existing analysis tools which were created for Lustre on the secondary Lustre tier in the object store capacity tier 130.

In another exemplary implementation, a long-running HPC computation goes through multiple cycles of checkpoint and restart. The primary Lustre storage system 102 is busy providing checkpoint storage for active computations and restart bandwidth for resuming computations. After many checkpoints have been stored, users want to run time-series analysis on a sequence of checkpoint data to observe material interactions over the virtual time-series of the computation. The user can run the analysis using the Lustre clients 124 or can create Map-Reduce jobs that query the new translation layer in the translation shim 210 to acquire object IDs which can be read through HDFS protocols.

CONCLUSION

One or more embodiments of the invention provide a multi-tier storage system with direct client access to an archive storage tier. In one or more embodiments, the disclosed multi-tier storage system with direct client access to the archive storage tier for input/output operations combines the financial benefits of heterogeneous hardware tiers without the performance limitations of a hierarchical, tiering software architecture.

The foregoing applications and associated embodiments should be considered as illustrative only, and numerous other embodiments can be configured using the techniques disclosed herein, in a wide variety of different applications.

It should also be understood that the techniques for multi-tier storage, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed multi-tier storage techniques may be implemented using one or more processing platforms. One or more of the processing modules or other components may therefore each run on a computer, storage device or other processing platform element. A given such element may be viewed as an example of what is more generally referred to herein as a "processing device."

Figure 8:
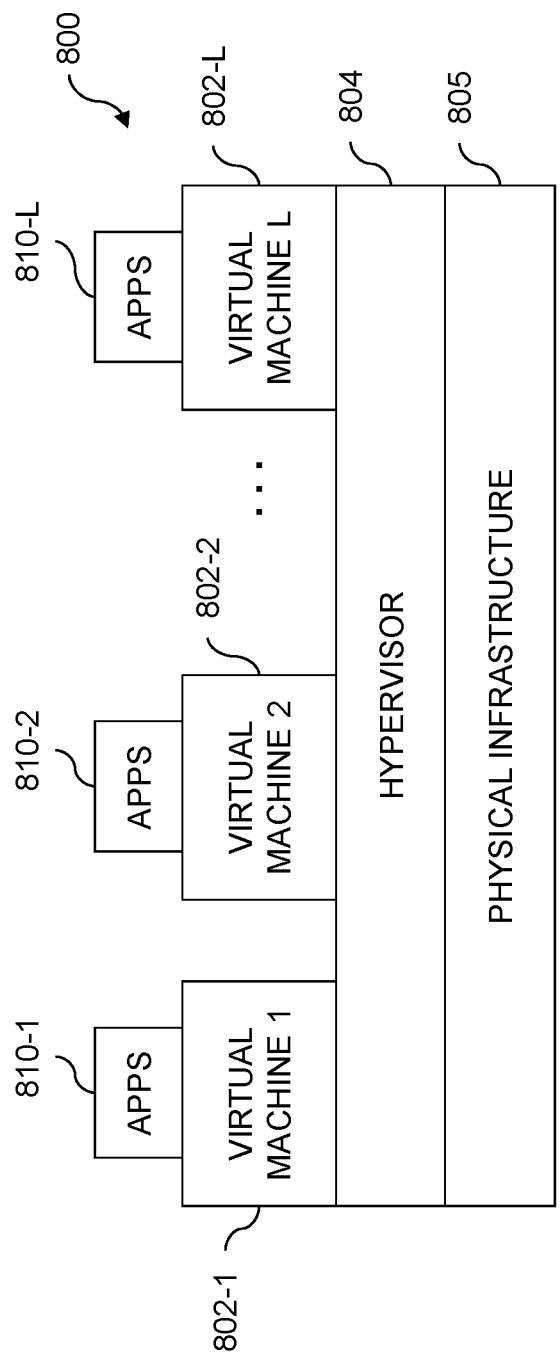
FIG. 8 illustrates an exemplary processing platform that may be used to implement at least a portion of one or more embodiments of the invention comprising a cloud infrastructure.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2 . . . 802-L implemented using a hypervisor 804. The hypervisor 804 runs on physical infrastructure 805. The cloud infrastructure 800 further comprises sets of applications 810-1, 810-2 . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controller, authentication server or relying server in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 9:
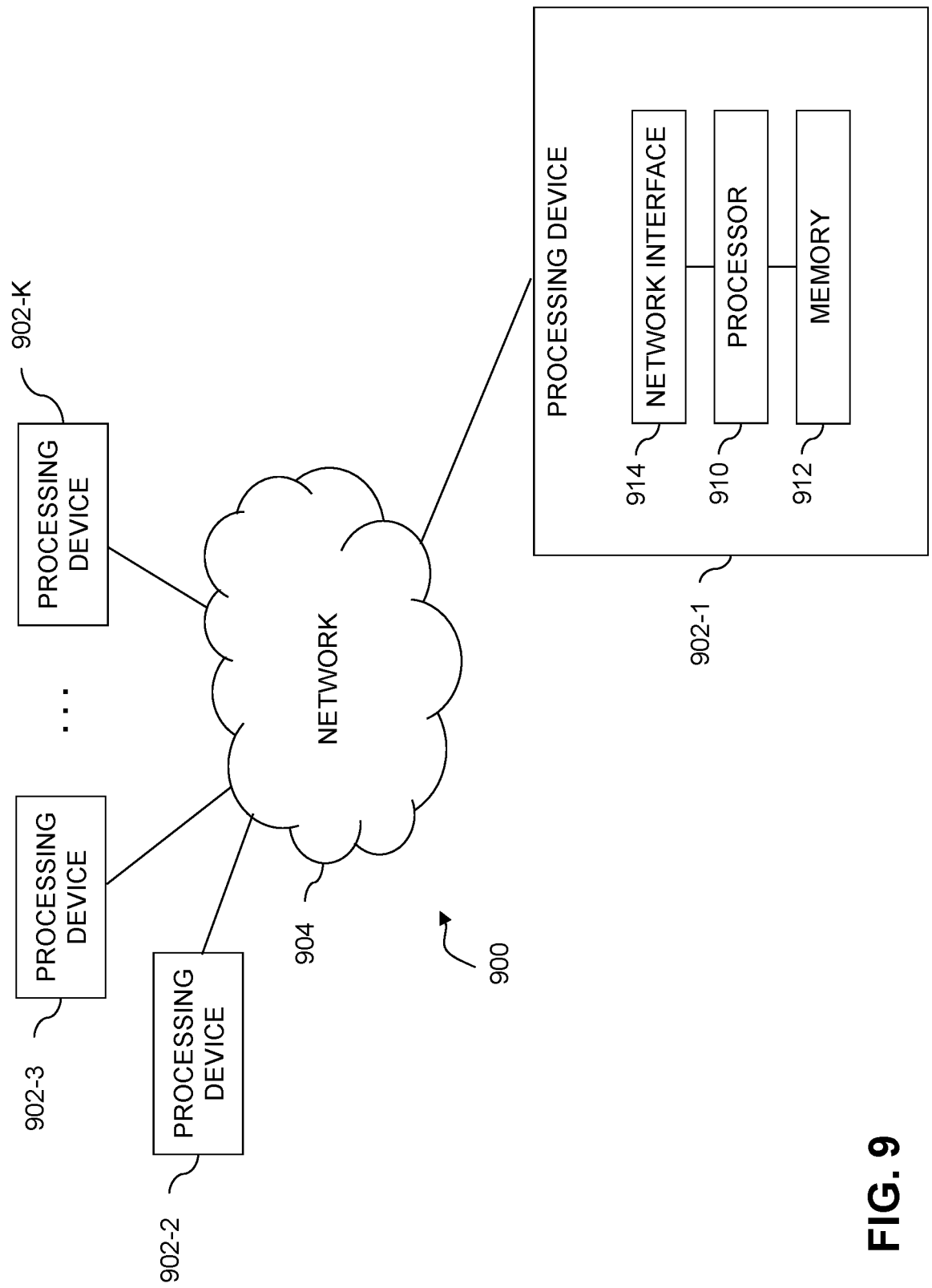
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. An apparatus, comprising:
   a memory; and
   at least one processing device, coupled to the memory, operative to implement the following steps:
   communicating, by a compute node over a network, with (i) a cluster file system on a first storage tier, and (ii) a second storage tier, wherein the first and second storage tiers comprise respective disjoint subsets of storage, wherein said first storage tier has a substantially lower access time than the second storage tier;
   providing a client, on said compute node, of said cluster file system with access to one or more files in said cluster file system on said first storage tier using a first object protocol; and
   executing, by said compute node, a translation shim that converts between the first object protocol and a different, second object protocol corresponding to said second storage tier to provide said client of said cluster file system with one or more of direct read access and direct write access to one or more files on said second storage tier using the first object protocol, wherein said translation shim provides said client of said cluster file system with direct write access to a given file on said second storage tier by at least storing, in a bucket on said second storage tier, (i) a layout for said given file, wherein the layout comprises at least one parameter indicating a location of said given file within said cluster file system on said first storage tier, and (ii) a plurality of shard objects of said given file.

2. The apparatus of claim 1, wherein said layout for said given file is obtained from a metadata warehouse corresponding to said cluster file system on said first storage tier, and wherein said layout is stored as an object in said bucket on said second storage tier.

3. The apparatus of claim 1, wherein said direct read access of said given file from said second storage tier comprises said translation shim obtaining storage location information from a metadata warehouse, obtaining contents of said bucket on said second storage tier storing said layout for said given file and said plurality of shard objects of said given file and providing shard object identifiers on said second storage tier to said client of said cluster file system; and said cluster file system reading one or more of said plurality of shard objects of said given file from said second storage tier using said shard object identifiers, wherein said translation shim transforms object get operations from said second storage tier to file block read input/output operations.

4. The apparatus of claim 1, wherein, in response to said client of said cluster file system opening said given file with a predefined attribute, said translation shim selects a substantially fastest tier that stores said given file when said given file is stored on a plurality of storage tiers.

5. The apparatus of claim 4, wherein said translation shim obtains said layout for said given file and storage address information for said given file from said bucket on said second storage tier corresponding to said given file.

6. The apparatus of claim 1, wherein said translation shim is further configured to detect a request by said client of said cluster file system to archive said given file, and provide a data movement command to a copy agent of a Hierarchical Storage Manager on said cluster file system to archive said given file on said second storage tier.

7. The apparatus of claim 6, wherein said translation shim is further configured to translate one or more protocols between said first storage tier and said second storage tier during a Hierarchical Storage Management operation.

8. The apparatus of claim 6, wherein said translation shim is further configured to one or more of provide a request to delete said given file to a metadata server on said cluster file system and update a metadata warehouse with one or more locations of said given file on said second storage tier.

9. The apparatus of claim 1, wherein said second storage tier comprises an object store capacity tier, and wherein said client of said cluster file system is provided one or more of said direct read access and said direct write access to said one or more files on said second storage tier using the first object protocol based at least in part on an internet protocol (IP) address associated with said object store capacity tier.

10. The apparatus of claim 1, further comprising the steps of intercepting a file lookup request for a file from a file system client and providing said client with location information for copies of said file on one or more of said first storage tier and said second storage tier, and wherein said file system client performs an input/output operation on said file using said location information.

11. A method, comprising the steps of:
communicating, by a compute node, over a network with (i) a cluster file system on a first storage tier, and (ii) a second storage tier, wherein the first and second storage tiers comprise respective disjoint subsets of storage, wherein said first storage tier has a substantially lower access time than the second storage tier;
providing a client, on said compute node, of said cluster file system with access to one or more files in said cluster file system on said first storage tier using a first object protocol; and
executing a translation shim that converts between the first object protocol and a different, second object protocol corresponding to said second storage tier to provide said client of said cluster file system with one or more of direct read access and direct write access to one or more files on said second storage tier using the first object protocol, wherein said translation shim provides said client of said cluster file system with direct write access to a given file on said second storage tier by at least storing, in a bucket on said second storage tier, (i) a layout for said given file, wherein the layout comprises at least one parameter indicating a location of said given file within said cluster file system on said first storage tier, and (ii) a plurality of shard objects of said given file.

12. The method of claim 11, wherein said layout for said given file is obtained from a metadata warehouse corresponding to said cluster file system on said first storage tier, and wherein said layout is stored as an object in said bucket on said second storage tier.

13. The method of claim 11, wherein said direct read access of said given file from said second storage tier comprises said translation shim obtaining storage location information from a metadata warehouse, obtaining contents of said bucket on said second storage tier storing said layout for said given file and said plurality of shard objects of said given file and providing shard object identifiers on said second storage tier to said client of said cluster file system; and said cluster file system reading one or more of said plurality of shard objects of said given file from said second storage tier using said shard object identifiers, wherein said translation shim transforms object get operations from said second storage tier to file block read input/output operations.

14. The method of claim 11, wherein, in response to said client of said cluster file system opening said given file with a predefined attribute, said translation shim selects a substantially fastest tier that stores said given file when said given file is stored on a plurality of storage tiers and obtains said layout for said given file and storage address information for said given file from a said bucket on said second storage tier corresponding to said given file.

15. The method of claim 11, wherein said translation shim is further configured to detect a request by said client of said cluster file system to archive said given file, and provide a data movement command to a copy agent of a Hierarchical Storage Manager on said cluster file system to archive said given file on said second storage tier.

16. The method of claim 11, further comprising the steps of intercepting a file lookup request for a file from a file system client and providing said client with location information for copies of said file on one or more of said first storage tier and said second storage tier, and wherein said file system client performs an input/output operation on said file using said location information.

17. A computer program product, comprising a non-transitory machine-readable storage medium having encoded therein executable code of one or more software programs, wherein the one or more software programs when executed by at least one processing device perform the following steps:
communicating over a network with (i) a cluster file system on a first storage tier, and (ii) a second storage tier, wherein the first and second storage tiers comprise respective disjoint subsets of storage, wherein said first storage tier has a substantially lower access time than the second storage tier;
providing a client, on said compute node, of said cluster file system with access to one or more files in said cluster file system on said first storage tier using a first object protocol; and
executing, by said compute node, a translation shim that converts between the first object protocol and a different, second object protocol corresponding to said second storage tier to provide said client of said cluster file system with one or more of direct read access and direct write access to one or more files on said second storage tier using the first object protocol, wherein said translation shim provides said client of said cluster file system with direct write access to a given file on said second storage tier by at least storing, in a bucket on said second storage tier, (i) a layout for said given file, wherein the layout comprises at least one parameter indicating a location of said given file within said cluster file system on said first storage tier, and (ii) a plurality of shard objects of said given file.

18. The computer program product of claim 17, wherein said layout for said given file is obtained from a metadata warehouse corresponding to said cluster file system on said first storage tier, and wherein said layout is stored as an object in said bucket on said second storage tier.

19. The computer program product of claim 17, wherein said direct read access of said given file from said second storage tier comprises said translation shim obtaining storage location information from a metadata warehouse, obtaining contents of said bucket on said second storage tier storing said layout for said given file and said plurality of shard objects of said given file and providing shard object identifiers on said second storage tier to said client of said cluster file system; and said cluster file system reading one or more of said plurality of shard objects of said given file from said second storage tier using said shard object identifiers, wherein said translation shim transforms object get operations from said second storage tier to file block read input/output operations.

20. The computer program product of claim 17, wherein, in response to said client of said cluster file system opening said given file with a predefined attribute, said translation shim selects a substantially fastest tier that stores said given file when said given file is stored on a plurality of storage tiers and obtains said layout for said given file and storage address information for said given file from said bucket on said second storage tier corresponding to said given file.

\* \* \* \* \*